(12) United States Patent
Betzen

(10) Patent No.: US 6,314,914 B1
(45) Date of Patent: *Nov. 13, 2001

(54) CAPACITOR POWERED ANIMAL REPELLING AND TRAINING DEVICE WITHOUT BAIT

(76) Inventor: Keith M. Betzen, P.O. Box 5604, Bloomington, IN (US) 47407-5604

( * ) Notice: Subject to any disclaimer, the term of this patent is extended or adjusted under 35 U.S.C. 154(b) by 0 days.

This patent is subject to a terminal disclaimer.

(21) Appl. No.: 09/484,949

(22) Filed: Jan. 18, 2000

Related U.S. Application Data

(60) Provisional application No. 60/117,406, filed on Jan. 27, 1999.

(51) Int. Cl.⁷ ............................................. A01K 15/02
(52) U.S. Cl. ........................................ 119/712; 43/98
(58) Field of Search ........................... 119/712, 174; 43/98, 112, 124; 52/101; 49/59

(56) References Cited

U.S. PATENT DOCUMENTS

| | | |
|---|---|---|
| 922,377 | 5/1909 | Ames . |
| 2,579,178 | 12/1951 | Dierking . |
| 3,900,770 | 8/1975 | Kaufman ............... 317/148.5 B |
| 4,153,009 | 5/1979 | Boyle ........................... 119/29 |
| 4,394,583 | 7/1983 | Standing ..................... 307/108 |
| 4,476,810 | 10/1984 | Heras .......................... 119/29 |
| 4,630,571 | * 12/1986 | Palmer ........................ 119/712 |
| 5,095,646 | 3/1992 | Bunkers ........................ 43/98 |
| 5,381,298 | 1/1995 | Shaw ........................... 361/232 |
| 5,514,919 | 5/1996 | Walley ......................... 307/109 |
| 5,894,818 | 4/1999 | Betzen ........................ 119/712 |
| 6,014,951 | * 1/2000 | Betzen ........................ 119/712 |

FOREIGN PATENT DOCUMENTS

| | | |
|---|---|---|
| 82560 | 10/1919 | (CH) . |
| 440270 | 7/1912 | (FR) . |

* cited by examiner

Primary Examiner—Charles T. Jordan
Assistant Examiner—Judith A. Nelson

(57) ABSTRACT

In order to deter pest animals from certain areas, an unbaited, portable, wireless, capacitor powered animal repelling and training device is provided for pest control applications where the use of bait would be undesirable. This device is deployed such that pest animals attracted to the protected area by incidental attractants, such as shelter or garbage, will contact the electrodes, receive an electric shock and be frightened from the area. Pest animals will then continue to avoid the protected area because of a scarecrow effect provided by the presence of the device.

2 Claims, 1 Drawing Sheet

CAPACITOR POWERED ANIMAL REPELLING AND TRAINING DEVICE WITHOUT BAIT

CROSS-REFERENCE TO RELATED APPLICATIONS

This application is entitled to the benefit of Provisional Patent Application Ser. No. 60/117,406 filed Jan. 27, 1999.

FIELD OF THE INVENTION

This invention relates to electric animal repelling and training devices; particularly to an unbaited electric animal repelling and training device which has the deterrent energy stored in a capacitor.

BACKGROUND OF THE INVENTION

The control of damage caused by wild and domestic animals is an ongoing challenge. The magnitude of the problem is indicated by the many types of devices and methods that have been used in attempts to control animal behavior and to keep them out of certain areas.

Most types of animal deterrent devices are ineffective because animals soon learn to ignore what does not harm them. Conversely, it has been shown that animals learn immediately to avoid areas where they have been harmed. For this reason, repelling and training devices which deliver an electric shock have proven to be very effective in altering animal behavior, and the use of shock producing devices results in immediate retreat and long term avoidance behaviors.

Electric animal repelling and training devices have been described with various power systems. A shocking device powered by the spark plug of a gasoline engine is shown by Dierking, U.S. Pat. No. 2,579,178 (1951). Devices such as shown by U.S. Pat. No. 4,153,009 to Boyle (1979), and U.S. Pat. No. 4,630,571 to Palmer (1986) use power directly from batteries. Other devices such as U.S. Pat. No. 922,377 to Ames (1909), French Patent 440,270 to Calvert (1912), Swiss Patent 82,560 to Baumann (1919), U.S. Pat. No. 4,476,810 to Heras (1984), and U.S. Pat. No. 5,095,646 to Bunkers (1992) use a continuous pulsating direct current or a battery and a converter. Modern fence charging devices are shown by U.S. Pat. No. 3,900,770 to Kaufman (1975), U.S. Pat. No. 4,394,583 to Standing (1983), U.S. Pat. No. 5,381,298 to Shaw (1995) and U.S. Pat. No. 5,514,919 to Walley (1996) which use various electronic circuits to produce a pulsating charge. While some modern fence charging devices use a capacitor to stabilize or to increase the output of the devices, none of these devices suggest using a capacitor alone as the energy storage mechanism of the device.

U.S. Pat. No. 5,894,818 to Betzen (1999) describes a baited animal repelling and training device in which the deterrent voltage that is maintained across the electrodes is stored in a capacitor. The innovation of using a capacitor to store the deterrent energy in a baited animal control device as described by Betzen (1999) allowed the creation of a small, easily portable, wireless device which delivers a single pulse of high voltage energy with a very low amperage, a very short discharge time and a short current path through the target pest animal attracted to the bait used on the device.

The situations and the species involved in animal control are widely varied and in many applications for an animal deterrent device it would be counterproductive to apply additional attractant to the area, thus rendering the device as described by Betzen (1999) less useful in these applications. In these cases the target pest animals are drawn to contact the deterrent device by their seeking shelter, garbage or other attractants incidental to the area.

Animal deterrents are required for such diverse situations as to keep marauding squirrels from bird feeders, to train cats to stay off of countertops, to scare rabbits out of flower beds, to prevent birds from perching in barns, to discourage pets from sleeping on furniture, or to eliminate dogs or racoons from garbage cans. Using a deterrent device that incorporated additional bait or attractant in these situations would be undesirable. Any additional attractant added to these situations would compound the problem by attracting even more pest animals to the area.

SUMMARY OF THE INVENTION

The capacitor powered device claimed by Betzen (1999) consists of a field unit with a protective housing, bare electrodes, a support means, and an area for bait. This baited animal repelling and training device has many advantages, but a baited device would not be desirable in many animal control situations.

The prior art does not suggest an unbaited, capacitor powered, animal repelling and training device.

The present invention is exemplified herein by various embodiments of animal control devices for different species and under different circumstances which demonstrate novel uses for the technology described by Betzen (1999) but without using bait. The target pest animals are drawn to these devices for other reasons, such as the feed in bird feeders, the food on a kitchen counter, flowers or garden plants, protection from the elements, the comfort of a couch or the garbage in garbage cans.

Accordingly, various objects and features of the device of the present invention are described subsequently.

A principal object of the present invention is to provide an effective and efficient method to repel and train animals in various situations using a capacitor to store the deterrent energy, but without using bait. The present invention has all of the advantages described by Betzen (1999), but without the disadvantages that adding bait would bring to many animal control situations. The innovation of the present invention eliminates one of the features described by Betzen and by doing so provides additional advantages in many situations where a baited device would be undesirable, and so allows the technology described by Betzen (1999) to be applied to a more diverse range of animal control situations which do not overlap with the uses described by Betzen (1999).

It can be seen that the combination of features incorporated into the device of the present invention solves prior problems associated with this type of animal repelling and training device. The device of the present invention produces new and unobvious results that have not been produced by the prior art.

Additional features will become apparent from a consideration of the ensuing drawings and description.

DESCRIPTION OF THE PREFERRED EMBODIMENTS

Typical embodiments of the present invention will consist of a field unit having a protective housing to contain the electronic components and the batteries, and with two or more bare electrodes held by a support means and positioned so that a pest animal attracted to the area will touch the electrodes and receive an electric shock, and with the storage capacitor being used to maintain a predetermined voltage across the electrodes.

Figure 1:
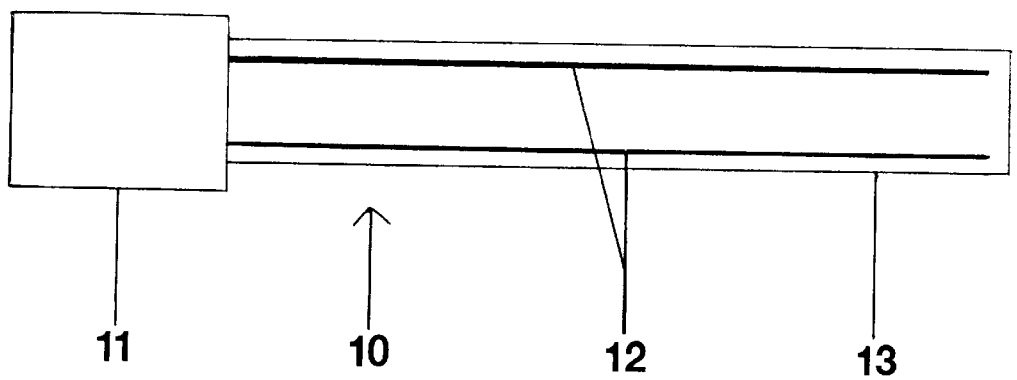
FIG. 1 shows a typical embodiment of the present invention.

The electrodes and support means will vary widely in their configuration, depending on the species to be deterred and the situation. A typical configuration of electrodes and support means useful to control various species of pest animals in common situations is illustrated in FIG. 1 which shows the animal repelling and training device 10 with the protective housing 11 which contains the storage capacitor and other electronic components (not illustrated). The protective housing 11 and the bare electrodes 12 are held by the support means 13.

To keep squirrels off of bird feeders, the support means with the electrodes can be wrapped around the pole of the feeder. Also, electrodes can be positioned on other areas of the bird feeder depending on the type of feeder and the approach used by the squirrels.

To keep indoor cats from jumping up unto counters and tables where they are not wanted, the electrode strips are arranged such that they lie parallel to the edge of a kitchen counter or table and so are contacted when the animal jumps up.

To keep rabbits out of flower beds, bare wire electrodes connected to the storage capacitor are arranged such that they form a miniature electric fence which is positioned around the plants to be protected.

To keep birds from roosting in barns and other places where they are not wanted, the electrodes are applied to the top of perches commonly used by birds.

To control dogs, cats and other indoor pets, a mat containing electrode strips can be positioned on furniture or in front of doorways to discourage pets from jumping onto furniture or from entering certain areas.

To prevent dogs, cats, opossums and racoons from getting into garbage cans, electrode strips are arranged such that they are contacted by the pest animal's nose when they try to get into the garbage.

Figure 2:
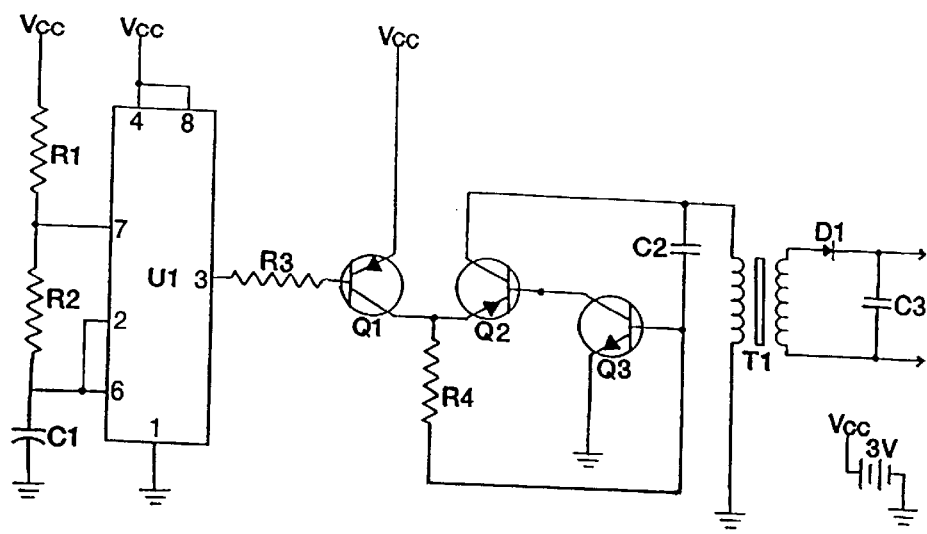
FIG. 2 shows a schematic drawing with the storage capacitor and with a typical circuit used to charge the storage capacitor.

FIG. 2 shows the storage capacitor and a schematic of a circuit that can be used to charge the storage capacitor C3 to about 360 volts when the battery voltage is about 3.1 volts and when transformer T1 has a primary/secondary ratio of 1/138. T1 has a 20 milliwatt power rating, a primary impedance of 8 ohms, and is operating in this circuit at 14 Khz. The values of the resistors are: R1=2.7M, R2=10K, R3=470 and R4=33K. The values of the capacitors are: C1=470 uf, 10 volt, electrolytic; C2=0.047 uf, 10 volt, ceramic; C3=1.5 uf, 400 volt, metalized polyester. The types of the transistors are: Q1 and Q2 are 2N2907; Q3 is a 2N2222. The diode, D1, is a IN4006. The timer, U1 is a ICM7555CN.

This circuit with these component values will charge the capacitor for 3.26 seconds with an interval of 14.7 minutes between charging pulses. The charging time, the interval, the capacitance of C3 and the voltage to which C3 is charged are all variable and will be adjusted to each situation and species. The power supply for this circuit is 2 AA batteries in series. All components are ¼ watt, and all components are readily available, except the transformer, which is custom made for each application.

The descriptions of the present invention contained herein are exemplifications of typical embodiments and are considered as illustrative only of the principles of this invention. Although this description contains various specificities, these should not be construed as limitations on the scope of this invention. These devices can be made for various species, with various housings, with various support means, or the support means may be combined with the housing. These devices may be made with various numbers and configurations of electrodes, or they could be made so that the housing acts as one pole of the circuit with the other pole connected to protruding electrodes which are insulated from the housing. They can operate with various electronic charging circuits and at a wide range of voltages and capacitances, and other deterrents such as sharp sounds or noxious sprays could be incorporated. Other changes in size, color, materials, shape, form, function and manner of operation, assembly and use, are deemed readily apparent and do not depart from the scope of the present invention which is limited only by the following claims and their legal equivalents.

The invention claimed is:

1. An electric animal repelling and training device comprising a field unit with a protective housing and a support means to position said device in an area to be protected and to support a plurality of bare electrodes arranged so that pest animals touching said electrodes will close the circuit between said electrodes-and so receive an electric shock and be frightened from said area, and with said electric animal repelling and training device having a capacitor as means to maintain a predetermined voltage across said electrodes, with the improvement comprising said device being unbaited;

whereby said animal repelling and training device functions as an unbaited, portable, wireless, capacitor powered, shock-producing device to deter said pest animals from said area where the use of bait would be undesirable.

2. A method of repelling and training pest animals comprising of steps of:

(a) deploying an unbaited electric animal repelling and training device comprising a field unit with a protective housing and a support means to position said device in an area to be protected and to support a plurality of bare electrodes arranged so that said pest animals being attracted to said device by incidental attractants and touching said electrodes will close the circuit between said electrodes and so receive an electric shock and be frightened from said area, and with said unbaited electric animal repelling and training device having a capacitor as means to maintain a predetermined voltage across said electrodes.

(b) maintaining said unbaited animal repelling and training devices in said area to provide a scarecrow effect and so train said pest animals to continue to avoid said area.

\* \* \* \* \*